United States Patent

[11] 3,584,850

[72] Inventors William W. Brandvold
 Gary, Ind.;
 Stewart W. Tresouthick, Allison Park, Pa.
[21] Appl. No. 838,560
[22] Filed July 2, 1969
[45] Patented June 15, 1971
[73] Assignee United States Steel Corporation

[54] ROTARY KILN FOR SHOCK SINTERING
 20 Claims, 6 Drawing Figs.
[52] U.S. Cl. ............................................... 263/32
[51] Int. Cl. .............................................. F27b 7/00
[50] Field of Search ................................... 263/32, 53

[56] References Cited
 UNITED STATES PATENTS
 1,071,303 8/1913 Dreisbach et al. ............ 263/32 X
 2,410,598 11/1946 Cliffe ............................ 263/32
 2,823,910 2/1958 Ravasio ........................ 263/32

Primary Examiner—John J. Camby
Attorney—Robert J. Leek, Jr.

ABSTRACT: This invention relates to a method of and apparatus for pyroprocessing raw material having a reaction temperature and containing moisture into sinter.

The apparatus has a rotary kiln adapted to receive the raw material pellets at one end of the rotary kiln and to move the raw material pellets along a path of movement in the rotary kiln to the other end of the rotary kiln. Heating means are adjacent the other end of the rotary kiln for directing a heated fluid through the rotary kiln, the rotary kiln having a drying means adjacent the one end of the rotary kiln for heating the raw material pellets by the heated fluid to substantially remove the moisture in the raw material pellets. Cooling means communicate with the drying means for mixing a cooling fluid with the heated fluid to limit the temperature in the drying means below the temperature at which the raw material pellets explode due to rapid heating to a deleteriously high temperature. The rotary kiln has a preheating zone adjacent the drying means further along the path of movement for heating the raw material pellets to a temperature below the reaction temperature. The rotary kiln has a reaction zone adjacent the other end of the rotary kiln for heating the raw material pellets above the reaction temperature to pyroprocess the raw material pellets into the sinter. Restriction means are between the preheating zone and the reaction zone for damming a reservoir of the raw material pellets adjacent the restriction means so that the reservoir of the raw material pellets is protected from the direct radiation of the heated fluid and the temperature of the reservoir of raw material pellets remains unaffected by instantaneous changes in the temperature of the heated fluid, the restriction means being operable to meter minimum layers of the raw material pellets into the reaction zone so that the minimum layers of the raw material pellets are individually and rapidly heated to the reaction temperature by the heated fluid and the raw material pellets are converted into sinter.

The method includes the steps of receiving the raw material pellets at one end of a rotary kiln and moving the raw material pellets along a path of movement in the rotary kiln to the other end of the rotary kiln; directing a heated fluid through the rotary kiln; heating the raw material pellets by the heated fluid adjacent the one end of the rotary kiln to substantially remove the moisture in the raw material pellets; mixing a cooling fluid with the heated fluid to limit the temperature (during the removal of the moisture) below the temperature at which the raw material pellets explode due to rapid heating to a deleteriously high temperature; heating the raw material pellets in a preheating zone of the rotary kiln further along the path of movement to a temperature below the reaction temperature; damming a reservoir of the raw material pellets adjacent the preheating zone and further along the path of movement so that the reservoir of the raw material pellets is protected from the direct radiation of the heated fluid and the temperature of the reservoir of the raw material pellets remains unaffected by instantaneous changes in the temperature of the heated fluid; metering minimum layers of the raw material pellets adjacent the preheating zone and further along the path of movement into a reaction zone of the rotary kiln adjacent the other end of the kiln; and heating raw material pellets individually and rapidly in the reaction zone of the rotary kiln to individually and rapidly heat the raw material pellets to the reaction temperature by the heated fluid, thus converting the raw material pellets into the sinter.

ROTARY KILN FOR SHOCK SINTERING

BACKGROUND OF THE INVENTION

Typical rotary kilns employed in industry today are generally cylindrical in shape and rotate about their longitudinal axis at approximately 1 r.p.m. The nominal size of such a kiln used in marking, for example, portland cement clinker may be about 12 feet in diameter by about 450 feet long and such kiln is inclined at an angle of about 3° from the horizontal. Cement raw materials are fed into the upper or elevated end of the kiln in the form of either dry granulated powder, finely ground slurry or nodules. As the kiln rotates, the feed moves slowly down the kiln often requiring about 3 hours to travel the length of the kiln. As the feed enters the kiln, it is exposed to the hot exhaust gases passing countercurrent over the material and, as the material traverses the length of the kiln, the temperature of the feed gradually rises. As the temperature increases, the moisture in the feed is driven off. Subsequently, as the temperature of the feed increases to approximately 1,600° F., calcination of the limestone begins and continues to completion prior to the feed entering the burning zone, By the time the feed enters the burning zone, it has reached a temperature of approximately 2,500° F. and is at the point of incipient fusion. It is essential to the process, as it is now practiced, that the temperature of the feed be raised at a uniform rate, hour after hour. Any change in the temperature of the feed in relation to the thermal input will cause a change in the thermal balance of the kiln. These changes in the thermal balance of the kiln will be reflected in the quality of the product produced. In the burning zone, the feed is exposed to the direct temperature of the flame and is raised to a temperature of approximately 2,750° F. with the formation of some liquid and, during this period, the desired chemical changes occur, for example, in the case of portland cement the principle phases formed are C3S, C2S, C3A, and C4AF. In a typical kiln, this burning zone would extend from about 25 to 70 feet from the discharge end of the kiln. The clinker formed in this zone contains sufficient liquid present to cause the material to fuse into different sized agglomerated nodules and lumps which move to the discharge end of the kiln where it is cooled prior to use.

The clinkering zone is readily discernible as the partial formation of the liquid in the feed not only causes the feed to form agglomerates but also adheres to the refractory lining of the kiln. In such a kiln operation, the buildup of clinker on the lining may increase to the point where it interferes with the normal kiln operation. It then becomes necessary to shut the kiln down for the time necessary to remove this material by breaking it up with a kiln gun or other means.

In a kiln such as described, it is essential for producing a uniform product that the thermal balance be maintained. The feed rate, kiln speed, firing rate all must be kept as uniform as possible or the quality of the clinker will vary. The present practice in controlling the thermal balance of the kiln is by changing the firing rate and/or kiln speed. Neither of these methods are satisfactory as a considerable time is required for these changes to take effect and, as a result, the thermal balance can be further upset and a cycling thermal balance condition will occur and it may require hours to reestablish a desirable thermally balance condition.

The rotary kiln has not changed basically in design or operating characteristics since it was first introduced. Attempts to improve the efficiency of the rotary kiln have resulted in changes in size, making them larger in diameter and longer in length. Insofar as is known, the basic concept and engineering principles have not been changed. The changes in length and diameter have resulted in some increase in thermal efficiency. However, the present kiln operation still leaves much to be desired. The use of external preheaters have considerably improved efficiency, but many disadvantages arise from the resulting complexity.

A method of pyroprocessing raw materials into a cementicious sinter is disclosed in U.S. Pat. application Ser. No. 425,962 filed Jan. 15, 1965, H. O. Nickelson et al., and assigned to the same assignee as the present application. The raw materials utilized may for example comprise:

| | Percent |
|---|---|
| $SiO_2$ | Up to 6 |
| $Al_2O_3$ | 52 to 74 |
| (including any $TiO_2$ which may be present) | |
| $CaO$ | 23 to 42 |
| $Fe_2O_3$ | 0.5 to 4 |
| Miscellaneous | .0 to 5 |

Here, as in the other compositions given below, the percentages are by weight. In one preferred embodiment of that invention the composition of the raw materials is:

| | Percent |
|---|---|
| $SiO_2$ | $4.5 \pm .5$ |
| $Al_2O_3$ | $63 \pm 1$ |
| (including minor proportions of $TiO_2$) | |
| $CaO$ | $30.7 \pm 1$ |
| $Fe_2O_3$ | $1.2 \pm .8$ |
| Miscellaneous | 0 to 2 |

In a second embodiment, the composition of the raw materials is:

| | Percent |
|---|---|
| $SiO_2$ | $4.5 \pm 0.6$ |
| $Al_2O_3/TiO_2$ | $55.0 \pm 2$ |
| $CaO$ | $38.0 \pm 2$ |
| $Fe_2O_3$ | $1.2 \pm 0.8$ |
| Miscellaneous | 0 to 2 |

It will be understood that $SiO_2$ and $Fe_2O_3$ are not necessary components, but they are included because they are present in available raw materials.

The method disclosed in such U.S. Pat. application Ser. No. 425,962 of making clinker for grinding into calcium aluminate cement includes the steps of providing a raw mix containing up to 6.0 percent $SiO_2$, between 52 and 74 percent $Al_2O_3/TiO_2$, 0.5 to 4 percent $Fe_2O_3$, 23 to 42 percent $CaO$ and up to 5 percent miscellaneous components, all percentages being by weight, and sintering the mixture at a temperature between 50° and 460° F. below the melting point of the mixture for at least 5 minutes.

Prior art kilns and methods are disclosed in the following US Patents.

| U.S. Patent No. | Inventor | Issued |
|---|---|---|
| 908,092 | Harding | 12/29/08 |
| 908,093 | Harding | 12/29/08 |
| 908,094 | Harding | 12/29/08 |
| 1,142,989 | Spackman et al | 6/19/15 |
| 1,209,219 | Spencer et al | 12/19/16 |
| 1,250,291 | Ellis | 12/18/17 |
| 2,229,383 | Lohse | 1/21/41 |
| 2,238,815 | Lohse | 4/15/41 |
| 2,330,631 | Seailles | 9/28/43 |
| 2,358,903 | Zutos | 9/26/44 |
| 2,407,135 | Clark | 9/19/46 |
| 2,670,193 | Pyzel | 2/23/54 |
| 2,758,828 | Pyzel | 8/14/56 |
| 2,863,726 | Kamlet | 7/17/62 |
| 2,933,796 | Somogyi | 4/26/60 |
| 2,986,457 | Jones | 5/30/61 |
| 3,022,989 | Pyzel | 2/27/62 |
| 3,044,756 | Grebe | 7/17/62 |
| 3,257,219 | Klein | 6/21/66 | and British patents:

| British Patent No. | Inventor | Complete accepted date |
|---|---|---|
| 248,282 | Noisin | 3/4/26 |
| 250,246 | Societe Anonyme etc. | 6/29/27 |
| 265,494 | Hertzka | 2/10/27 |

OBJECTS OF THE INVENTION

It is the general object of this invention to avoid and overcome the forgoing and other difficulties of and objections to prior art practices by the provision of a method of and a rotary kiln for rapid pyroprocessing of raw material into sinter. Such method and kiln:

1. provide a kiln having a length about one-third to two-thirds the length of conventional kilns, provide a greater throughput per unit length than conventional kilns and provide lower capital cost and installation costs than conventional kilns,
2. provide a shorter time interval at the temperature of formation for liquid-forming compounds thereby substantially eliminating the deposition of a coating on the kiln lining in the sintering zone,
3. maintain the load temperature below about 2,000° F. prior to the sintering zone and thereafter raises the load temperature very rapidly,
4. remove the load quickly from the kiln after the load reaches reaction temperature in the sintering zone,
5. provide a traveling double layer of raw material in the sintering zone thus providing a continuous direct contact between the raw material and the heated fluid gases in the sintering zone,
6. reduce the reaction time in the sintering zone from about 20—45 minutes to about 2—10 minutes, and
7. reduce the B.t.u. input per ton of product produced as the refractory material on the sloping section provides a highly effective surface for reflecting the heat back into the sintering zone, thus making it possible to maintain the desired sintering zone temperature with less fuel.

BRIEF SUMMARY OF THE INVENTION

The aforesaid objects of this invention, and other objects which will become apparent as the description proceeds, are achieved by providing a method of and apparatus for pyroprocessing raw material having a reaction temperature and containing moisture into sinter.

The apparatus has a rotary kiln adapted to receive the raw material pellets at one end of the rotary kiln and to move the raw material pellets along a path of movement in the rotary kiln to the other end of the rotary kiln. Heating means are adjacent the other end of the rotary kiln for directing a heated fluid through the rotary kiln, the rotary kiln having a drying means adjacent the one end of the rotary kiln for heating the raw material pellets by the heated fluid to substantially remove the moisture in the raw material pellets. Cooling means communicate with the drying means for mixing a cooling fluid with the heated fluid to limit the temperature in the drying means below the temperature at which the raw material pellets explode due to rapid heating to a deleteriously high temperature. The rotary kiln has a preheating zone adjacent the drying means further along the path of movement for heating the raw material pellets to a temperature below the reaction temperature. The rotary kiln has a reaction zone adjacent the other end of the rotary kiln for heating the raw material pellets above the reaction temperature to pyroprocess the raw material pellets into the sinter. Restriction means are between the preheating zone and the reaction zone for damming a reservoir of the raw material pellets adjacent the restriction means so that the reservoir of the raw material pellets is protected from the direct radiation of the heated fluid and the temperature of said reservoir of raw material pellets remains unaffected by instantaneous changes in the temperature of the heated fluid, the restriction means being operable to meter minimum layers of the raw material pellets into the reaction zone so that the minimum layers of the raw material pellets are individually and rapidly heated to the reaction temperature by the heated fluid and the raw material pellets are converted into sinter.

The method includes the steps of receiving the raw material pellets at one end of a rotary kiln and moving the raw material pellets along a path of movement in the rotary kiln to the other end of the rotary kiln; directing a heated fluid through the rotary kiln; heating the raw material pellets by the heated fluid adjacent the one end of the rotary kiln to substantially remove the moisture in the raw material pellets; mixing a cooling fluid with the heated fluid to limit the temperature during the removal of the moisture below the temperature at which the raw material pellets explode due to rapid heating to a deleteriously high temperature; heating the raw material pellets in a preheating zone of the rotary kiln further along the path of movement to a temperature below the reaction temperature; damming a reservoir of the raw material pellets adjacent the preheating zone and further along the path of movement so that the reservoir of the raw material pellets is protected from the direct radiation of the heated fluid and the temperature of the reservoir of the raw material pellets remains unaffected by instantaneous changes in the temperature of the heated fluid; metering minimum layers of the raw material pellets adjacent the preheating zone and further along the path of movement into a reaction zone of the rotary kiln adjacent the other end of the rotary kiln; and heating the minimum layers of the raw material pellets individually and rapidly in the reaction zone of the rotary kiln to individually and rapidly heat the raw material pellets to the reaction temperature by the heated fluid thus converting the raw material pellets into the sinter.

BRIEF DESCRIPTION OF THE SEVERAL VIEWS OF THE DRAWINGS

For a better understanding of this invention, reference should be had to the accompanying drawings, wherein like numerals of reference indicate similar parts throughout the several views and wherein:

FIG. 6 is a view similar to FIGS. 1, 4, 5 showing raw material pellet producing means.

Although the principles of this invention are broadly applicable to the pyroprocessing of raw material pellets into sinter, this invention is particularly adapted for use in conjunction with the pyroprocessing of portland cement, calcium aluminate cement, light weight aggregates and indurated products into sinter, and hence it has been so illustrated and will be so described.

DETAILED DESCRIPTION

Figure 1:
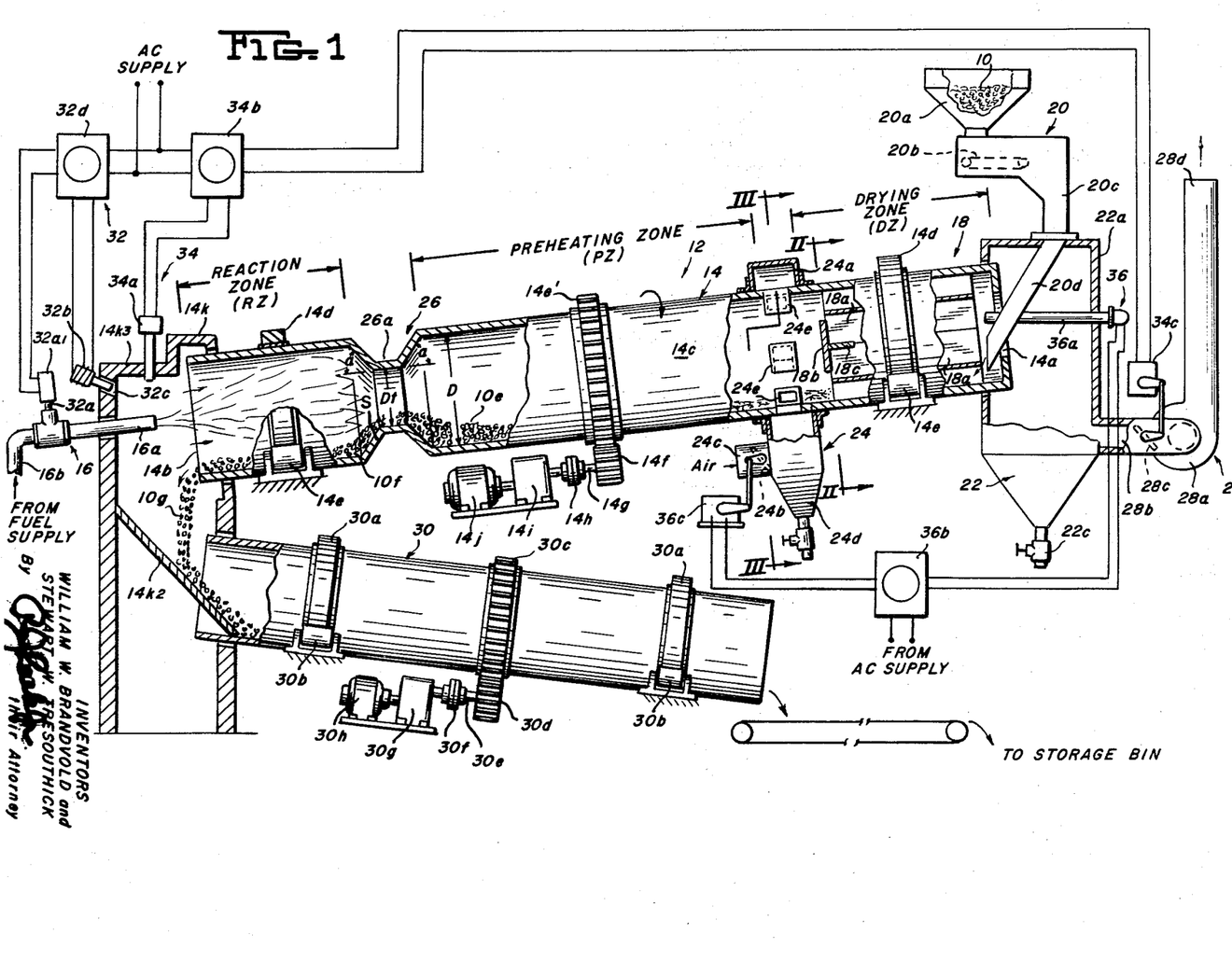
FIG. 1 is a cross-sectional view partially in section of the apparatus of this invention taken along the line I–I of FIGS. 2, 3 in the direction of the arrows.

With specific reference to the form of this invention illustrated in the drawings, and referring particularly to FIG. 1, an apparatus for pyroprocessing raw material pellets 10 having a reaction temperature of about 2,200° F. to 3,000° F. and containing moisture, is indicated generally by the reference numeral 12.

Raw Material 10

The raw material 10 may comprise raw material for the production of portland cement, or calcium aluminate cement, light weight aggregates, indurated products and mixtures having a generally spherical, cylindrical or the like shape and capable of fluid rolling motion.

By way of example, calcium aluminate cement sinter is preferably made from the following raw mixes in which the indicated members are percent are percent by weight:

|  | Broad Range | Type A | Type B |
|---|---|---|---|
| $SiO_2$ | 0-5.0 | 2.5-5.0 | 2.5-5.0 |
| $Al_2O_3/TiO_2$ | 28.0-56.0 | 32.0-37.0 | 35.0-41.0 |
| $Fe_2O_3$ | 0-7.0 | 5.0-7.0 | 0.4-1.4 |
| CaO | 14.0-42.0 | 23.0-28.0 | 21.0-26.0 |
| MgO | 0-3.0 | 0-1.5 | 0-1.5 |
| MnO | 0-1.0 | 0-0.6 | 0-0.6 |
| $SO_3$ as $CaSO_4$ | 0-4.0 | 0.5-2.6 | 0-1.6 |
| Alkalies | Trace | Trace | Trace |
| Loss on ignition | 26.0-33.0 | 27.0-31.0 | 26.0-33.0 |

Specific raw mixes which may be used for making clinker for Type A and Type B cements are:

|  | Type A | Type B |
|---|---|---|
| $SiO_2$ | 3.3 | 3.3 |
| $Al_2O_3/TiO_2$ | 35.2 | 38.5 |
| $Fe_2O_3$ | 6.2 | .8 |
| CaO | 23.9 | 23.5 |
| MgO | 0.1 | .8 |
| MnO | .3 | .3 |
| $SO_3$ as $CaSO_4$ | 1.6 | 1.6 |
| Alkalies | Trace | Trace |
| Loss on ignition | 29.4 | 31.2 |

For Type B cement it is also possible to use essentially the same mixture with the $SO_3$ omitted.

Calcium silicate cement clinkers are preferably made from the following raw mixes:

|  | Broad range | Portland raw mix Range | Portland raw mix Specific |
|---|---|---|---|
| $SiO_2$ | 15.0-24.0 | 16.0-16.8 | 15.4 |
| $Al_2O_3/TiO_2$ | 0.5-6.0 | 3.8-4.4 | 4.3 |
| $Fe_2O_3$ | Trace-4.0 | 1.4-1.8 | 1.5 |
| CaO | 40.0-65.0 | 48.5-50.0 | 49.5 |
| MgO | 1.0-3.0 | 2.0-2.6 | 2.2 |
| MnO | 0.1-0.8 | 0.2-0.4 | 0.2 |
| $SO_3$ as $CaSO_4$ | Trace-3.0 | Trace-3.0 | 1.6 |
| Alkalies | 0.2-0.8 | 0.2-1.0 | .5 |
| Loss on ignition | 22-28 | 23-27 | 24.8 |

In any of the cement mixes mentioned above, the initial heatings are done preferably at a temperature of approximately 1,600° F. In the case of calcium aluminate clinkers, the shock sintering is at a temperature of approximately between 50° and 150° F., below the melting point of the raw mix. For Type A cement clinkers the preferred temperature is approximately 2,600° F. For calcium silicate cement clinkers, the sintering is at a temperature of approximately between about 50° to 500° F. below the melting point of the raw mix. In making most portland cement clinkers, the temperature preferably is about 2,700° F. In each case, the feed may be subjected to the sintering temperature for as little as 2 minutes and preferably under 10 minutes.

Apparatus 12

The apparatus 12 has a rotary kiln 14 (FIGS. 1—3) adapted to receive the raw material pellets 10 at one end (in this case the input end 14a) of the rotary kiln 14 and to move the raw material pellets 10 along a path of movement (indicated by the arrows in FIG. 1 from right to left) in the rotary kiln 14 to the other end (in this case the discharge end 14b) of the rotary kiln 14.

Rotary Kiln 14

This rotary kiln 14 has a shell 14c (FIGS. 1—3) having a plurality of tires 14d (FIGS. 1, 2) rotatable and supportable on rollers 14e and the rotary kiln 14 is rotatable at about 3 r.p.m. by means of a girth gear 14e' (FIG. 1), pinion gear 14f on a shaft 14g, which shaft 14g is driven through a coupling 14h, reduction gear box 14i and motor 14j.

Heating means 16 are disposed adjacent the discharge end 14b of the rotary kiln 14 for directing a heated fluid namely the combustion gases from the heating means 16 through the kiln 14.

Heating Means 16

The heating means 16 (FIG. 1) has a burner 16a (for firing either pulverized coal, natural gas, fuel oil or the like) mounted in a hood 14k adjacent the discharge end 14b of the rotary kiln 14. In order to supply the fuel to the burner 16a, the fuel line 16b (FIG. 1) connects such burner 16a to a fuel supply (not shown) but indicated by the legend "From Fuel Supply." For the purpose of supplying air to the burner 16a, such air enters the discharge end 14b (in the direction of the arrows, FIG. 1) of the kiln 14 adjacent a pellet discharge baffle 14k2. The flame from the burner 16a substantially fills the discharge end 14b of the rotary kiln 14 as shown by the bulbous dotted lines in FIG. 1.

The rotary kiln 14 has a drying means 18 (FIGS. 1, 2) adjacent the inlet end 14a of the rotary kiln 14 for heating the raw material pellets 10 by the heated fluid to substantially remove the moisture in the raw material pellets 10.

Drying Means 18

Figure 2:
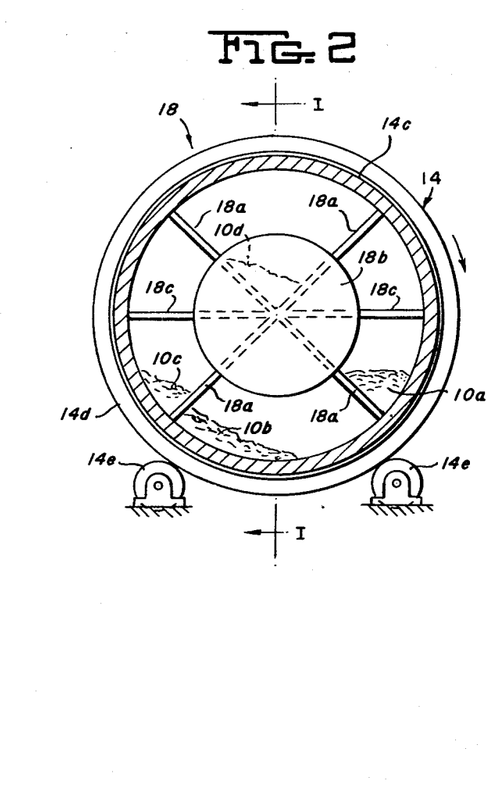
FIG. 2 is a sectional view taken along the line II–II of FIG. 1 in the direction of the arrows showing the baffle and the partitions in the drying means of the apparatus.
Figure 3:
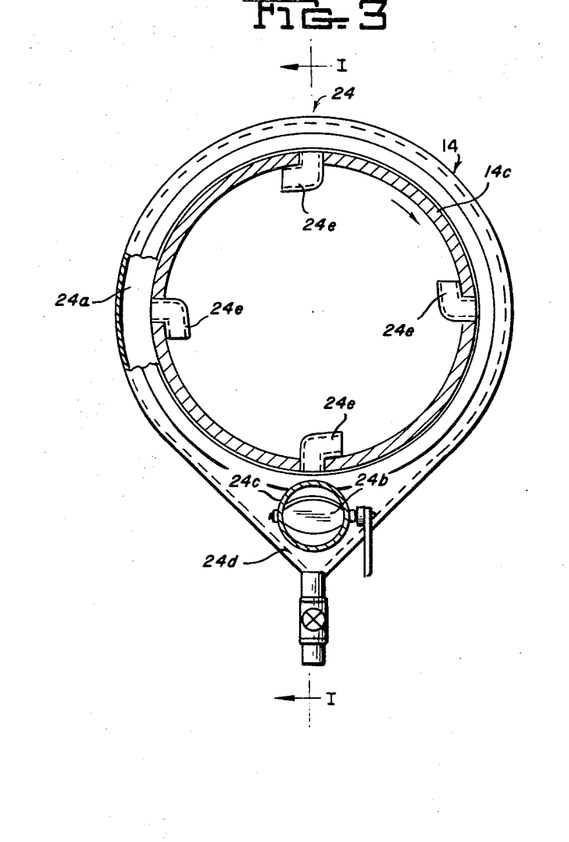
FIG. 3 is a sectional view taken along the line III–III of FIG. 1 in the direction of the arrows showing the inlet members, the shroud members and the control member in the cooling means of the apparatus.

In the embodiment of the drying means shown in FIGS. 1—3, the drying means 18 is a drying zone DZ (identified by the caption "Drying Zone") and contains a plurality of (in the example of FIGS. 1, 2) four partitions 18a extending inwardly from the shell 14c of the rotary kiln 14 and meeting approximately in the center of such rotary kiln 14 for the purpose of separating the raw material pellets 10 into a plurality of, in this case, four streams 10a, 10b, 10c, 10d (FIG. 2) of the raw material pellets 10 for a better heat exchange. A baffle 18b (FIGS. 1, 2) is disposed centrally in the kiln 14 in front of the partitions 18a by brackets 18c (FIG. 2). This baffle 18b prevents the pellets 10 from spilling from the partitions 18a so as to limit pellet degradation and dust pickup.

The raw material pellets 10 are fed into the drying zone by feeding means 20 (FIG. 1).

Feeding Means MEANS 20

Such raw material pellets 10 are fed into the drying zone from a hopper 20a (FIG. 1) by a weigh feeder 20b and chute 20c into a feed tube 20d, which feed tube 20d extends through the backhouse 22 (having a dust trap 22c, FIG. 1, and located adjacent the inlet end 14a of the rotary kiln 14). The weight feeder 20b is of the type similar to ABC Series 4300 Electronic Gravometric feeder complete with Eriez Model 70A Vibrating Feeder and manufactured by ABC Scale Division, McDowell Wellman Engineering Co., Cleveland, Ohio.

Cooling means 24 (FIGS. 1, 3) communicating with the drying zone DZ mixes a cooling fluid, such as ambient air, with the heated fluid to limit the temperature in the drying zone DZ below about 700° F. so that the raw material pellets 10 will not explode due to rapid heating to a deleteriously higher temperature about 700° F.

Cooling Means 24

As shown in FIGS. 1, 3 the cooling means 24 has a stationary shroud member 24a surrounding the shell 14c of the rotary kiln 14, which shroud member 24a is connected through a valve 24b by an inlet pipe 24c to the atmosphere. For the purpose of collecting dust and the like which enters the shroud member 24a, a hopper 24d (FIGS. 1, 3) communicates with the bottom of the shroud member 24a. In order to admit cooling air into the shell 14c of the rotary kiln 14, a plurality of (for example four) tuyeres 24e (FIGS. 1, 3) are disposed in equispaced relationship on the shell 14c. The tuyeres 24e are arranged to spiral the incoming cooling air to rapidly mix the cooling air with the heating fluid.

Preheating Zone

The rotary kiln 14 has a preheating zone PZ, (identified by the legend "Preheating Zone" in FIG. 1) adjacent the drying zone DZ further along the path of movement of the raw material pellets 10 for heating such raw material pellets 10 about 500° to 700° F. below the reaction temperature (i.e. about 2,200 to 3,000° F. of the raw material pellets 10).

Reaction Zone ZONE

The rotary kiln 14 also has a reaction zone RZ (identified by the legend "Reaction Zone" in FIG. 1) adjacent the discharge end 14b of the rotary kiln 14 for heating the raw material pellets 10 above the reaction temperature of about 2,200° F. to 3,000° F. for the raw material pellets 10.

Restriction Means 26

Restriction means (i.e. a dam 26 having a throat 26a, FIG. 1) is disposed between the preheating zone PZ and the reaction zone RZ for damming a reservoir 10e of raw material pellets 10 adjacent the dam 26 so that the reservoir 10e of raw material pellets 10 is protected by the dam 26 from the direct radiation of the heated fluid and the temperature of the reservoir 10e of the raw material pellets 10 remains unaffected by instantaneous changes in the temperature of the heated fluid. The dam 26 (FIG. 1) also provides a surface which acts as a reflector to maintain the temperature of the reaction zone RZ with reduced fuel usage. In addition, the dam 26 is operable to introduce minimum layers 10f (i.e. a monolayer or duolayer) of the raw material pellets 10 into the reaction zone RZ so that the minimum layers 10f of raw material pellets 10 in reaction zone are individually and rapidly heated to the reaction temperature of about 2,200° to 3,000° F. by the heated fluid and the raw material pellets 10 are converted into sintered pellets 10g (FIG. 1).

Pumping Means 28

In order to move the heated fluid through the rotary kiln 10 (in the direction of the arrows from left to right, (FIG. 1), means, such as the forced draft fan 28a (FIG. 1), in a conduit 28b (having a damper 28c and leading to the backhouse 22) expels such heated fluid through an exhaust conduit 28d to the atmosphere. The fan 28a may also, of course, draw in the cooling air for the drying zone DZ.

Cooler Means 30

For the purpose of cooling the sintered pellets 10g (FIG. 1) to ambient temperature (about 70° F.), cooler means, such as a rotary induced-type air cooler 30 manufactured by Fuller Co., Catasauqua, Pa., is disposed adjacent the discharge end 14b of the hood 14k. As shown in FIG. 1, such rotary cooler 30 is rotatable on tires 30a (which roll on rollers 30b) by a girth gear 30c driven by a pinion gear 30d on a shaft 30e, which shaft 30e is connected through a coupling 30f to a gear reduction unit 30g driven by a motor 30h. Combustion air for the heating means 16, of course, travels through the rotary cooler 30.

Heating Control Means 32

In order to control the operation of the burner 16a (FIG. 1), a valve means, such as the valve 32a, FIG. 1, (having a control member 32a1) is disposed adjacent the burner 16a in the fuel line 16b. The control member 32a1 is an electropneumatic transducer similar to Type 543 manufactured by Fisher Governor Co., Marshalltown, Iowa. The valve 32a is a diaphragm control valve either Type 657 or 667 manufactured by Fisher Governor Co. Reaction zone temperature measuring means, such as a radiation pyrometer 32b of the radiomatic type manufactured by Leeds and Northrup Co., Philadelphia, Pa., is inserted in a peephole 32c in the hood 14k and directed at the minimum layers 10f of raw material pellets 10 in the reaction zone RZ. A first control means, such as a recorder controller 32d, of the miniline 500 type and having a miniline 500 strip chart recorder type KL5110A and a miniline 500 controller type AD1 (all manufactured by Bailey Meter Co., Cleveland, Ohio), is connected to the valve 32a and the pyrometer 32b.

If the reaction zone temperature sensed by the pyrometer 32b falls below the desired operating temperature, about 2,580° F., for certain calcium aluminate cements, the valve 32a is further opened to admit more fuel to the burner 10a and conversely the valve 32a is further closed to limit the fuel supply to the burner 16a when the reaction temperature in the reaction zone RZ exceeds the desired temperature of about 2,580° F. in the example given above.

Pressure Control Means 34

For the purpose of controlling the flow of the heated fluid through the rotary kiln 14 (FIG. 1), a pressure-measuring means, suitably a differential pressure transmitter 34a of the type 252A manufactured by the Hays Co., Michigan City, Indiana, is mounted in the top wall 14k3, (as viewed in FIG. 1) of the hood 14k and a second control means, such as a controller recorder 34b (similar to controller recorder 32d) is connected to differential pressure transmitter 34a and a first actuator means, such as a modulating electric control drive 34c of the Type RC2 manufactured by Bailey Meter Co., Cleveland, Ohio, which control drive 34c is in turn connected to the damper 28c associated with the fan 28a (FIG. 1).

If the pressure drops in the hood 14k, below a predetermined value, the pressure control means 34 opens further the damper 28c to increase the flow of heated fluid through the rotary kiln 14. If the pressure increases above such predetermined value, the damper 28c is further closed by the pressure control means 34.

Drying Temperature Control Means 36

The structure utilized to control the flow of cooling air into the drying zone (FIG. 1) has a thermocouple 36a (suitably of the chromel-alumel type and having a range of about 0°— 2200° F.) mounted through the sidewall 22a of the backhouse 22 and extends into the inlet end 14a of the rotary kiln 14a third control means, such as the controller recorder 36b (similar to the controller-recorders 32d, 34b) is connected to the thermocouple 36a and to a second actuator means, such as a modulating electric control drive 36c (similar to the modulating electric control drive 34c) which modulating electric control drive 36c operates the damper 24b in the cooling air inlet line 24c.

When the drying zone temperature falls below about 700° F., the drying temperature control means 36 closes further the damper or valve 24b thus reducing the flow of cooling air into the drying zone DZ with attendant increase in the drying zone temperature. Conversely, when the drying zone temperature rises above about 700° F., the damper 24b is further opened to admit more cooling air into the drying zone DZ thereby reducing the drying zone temperature to the desired value (i.e. about 700° F.).

Alternative Embodiments

Figure 4:
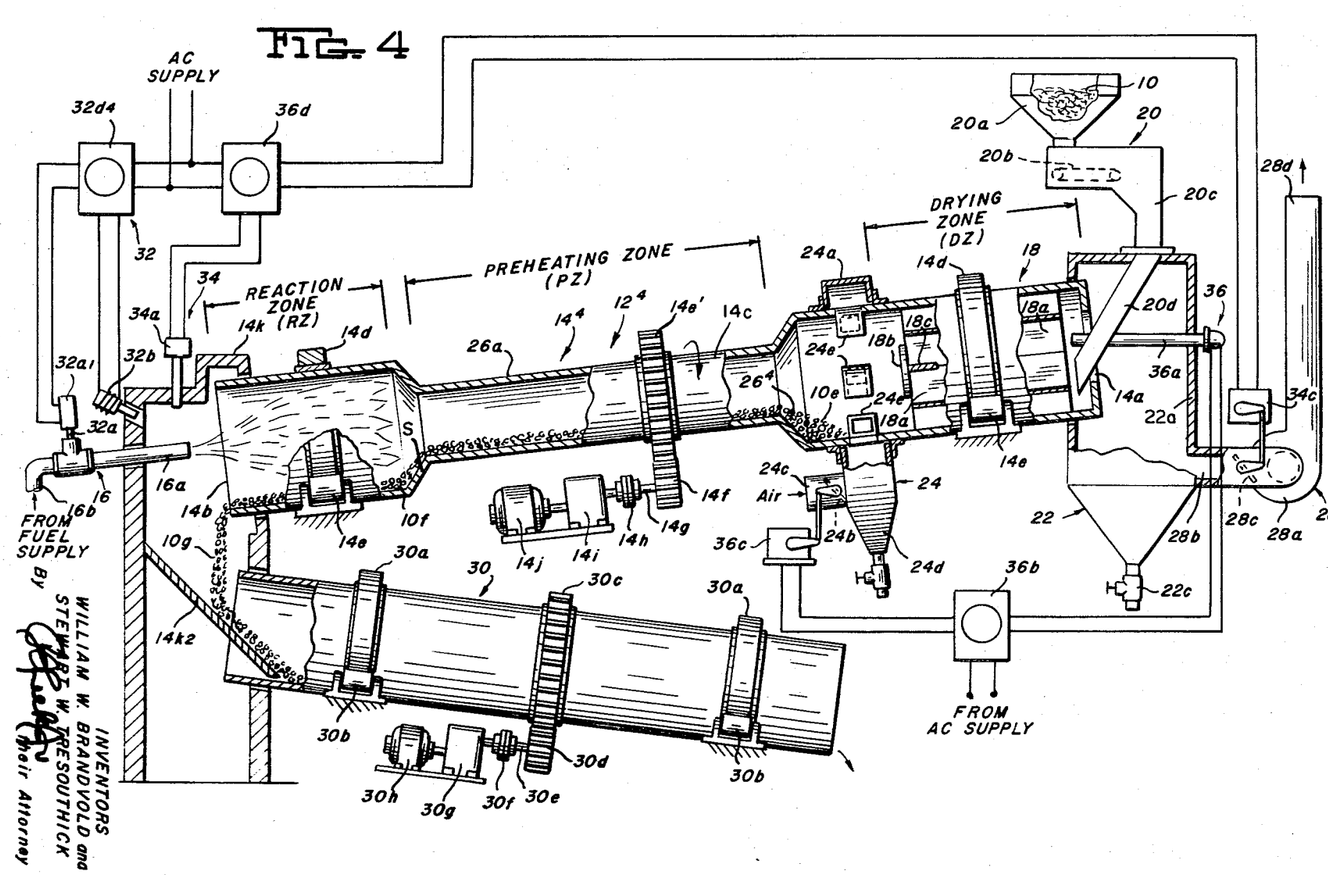
FIG. 4 is a view similar to FIG. 1 of an alternative embodiment of the apparatus and eliminating for clarity certain elements of the control means for the apparatus which control means are essentially the same as the control means shown in FIG. 1.

It will be understood by those skilled in the art that alternatively as shown in FIG. 4 the dam $26^4$ is disposed at the beginning of the preheating zone PZ and extends the length of the preheating zone PZ. The throat 26a of the dam $26^4$ extends the length of the preheating zone PZ. The heating control means 32, the pressure control means 34 and the drying temperature control means 36 for the embodiment of FIG. 4 are the same as shown in FIG. 1.

Figure 5:
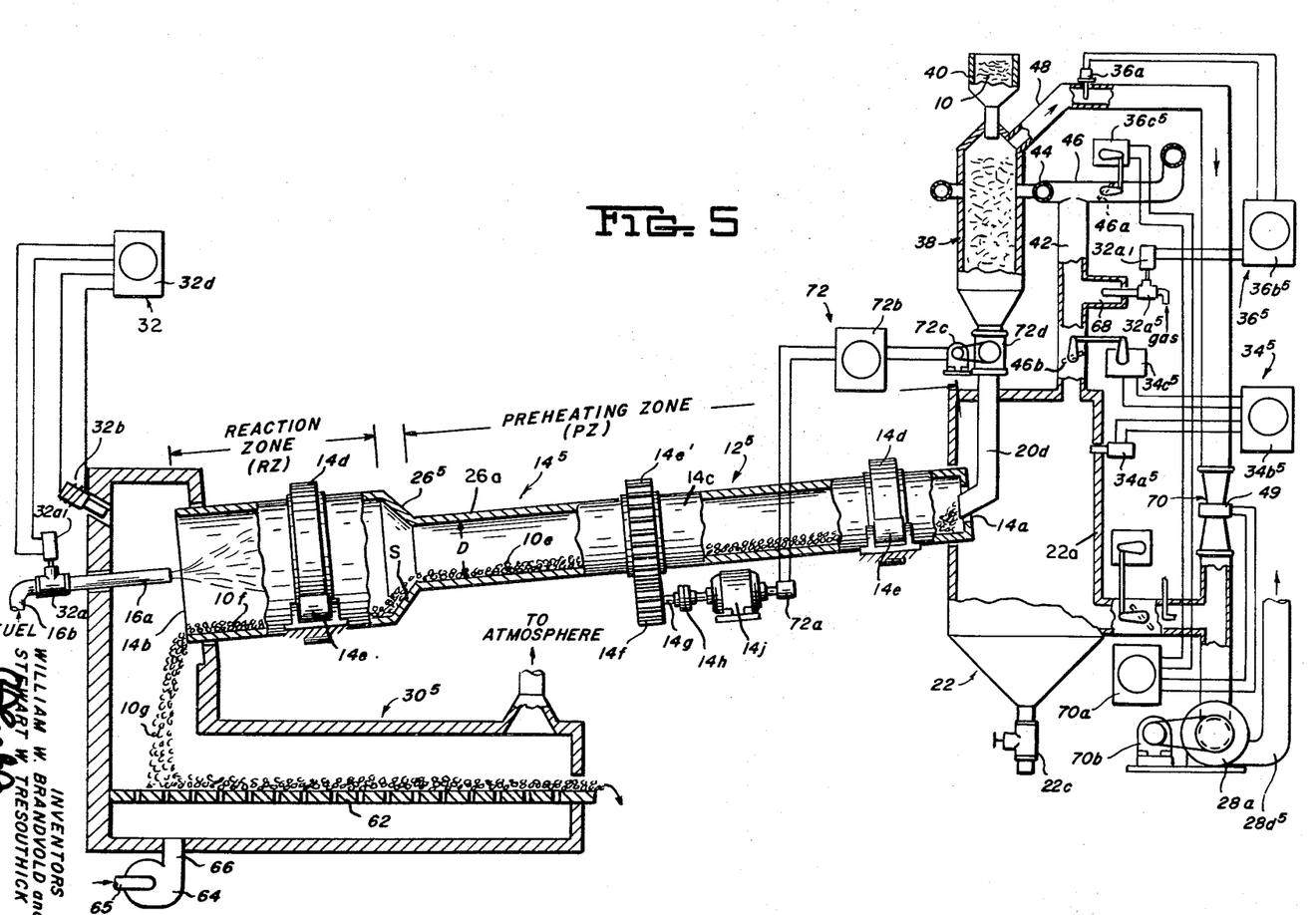
FIG. 5 is a view similar to FIG. 1 of a further alternative embodiment of the apparatus, showing an external drying means and the associated control means.

In FIG. 5, the drying means is a contact-dryer-type preheater 38 manufactured by Surface Combustion Div., Midland-Ross Corp., Toledo, Ohio, and is connected to the inlet end 14a of the rotary kiln $14^5$ by feed pipe or tube 20d. The raw material pellets 10 are fed from a surge and gas seal hopper 40 into the dryer preheater 38. The heated fluid is circulated through the backhouse 22 and through a conduit 42 to a bustle pipe 44, which bustle pipe 44 passes the heated fluid through tuyeres (not shown) to distribute the heated fluid around the periphery of the raw material pellets 10. A damper 46a in the cold air bleed pipe 46 permits the addition of cooling or heating tempering air into the bustle pipe 44, as desired, from a cold air bleed source (not shown). A damper 46b in the pipe 42 controls the flow of the heated fluid into the bustle pipe 44. The heated fluid is withdrawn from the preheater 38 by conduit 48 which extends through a venturi gas flow sensor 49 to the induced draft fan 28a and to the atmosphere via outlet 28$d^5$. The thermocouple 36a in this case is inserted in the outlet line 48.

The dried and partially preheated raw material pellets 10 pass through the pellet feeder and gas lock device 72d into the kiln feed pipe or tube 20d. The preheating zone PZ of the kiln 14$^5$ extends to the input end 14a, FIG. 5.

In FIG. 5, the cooler 30$^5$ is a pressure-type cooler of the type manufacture by Fuller Co., Catasauqua, Pa., and has a grate 62 either of the oscillating type or reciprocating type. Cooling air is pumped into the cooler 30$^5$ by a fan 64 from the atmosphere via an inlet 65 and a conduit 66.

As shown in FIG. 5 the heating means control 32 is essentially the same as shown in FIG. 1.

The pressure control means 34$^5$ (FIG. 5) has a pressure sensor 34$a^5$ (similar to the pressure sensor 34a, FIG. 1) disposed in the backwall 22a of the backhousing 22 and connected to a controller recorder 34$b^5$ (similar to controller-recorder 34b, FIG. 1), which controller-recorder 34$b^5$ operates an actuator 34$c^5$ (similar to the actuator 34c, FIG. 1) connected to the damper 46b.

The drying temperature control means 36$^5$ (FIG. 5) has the thermocouple 36a connected to a controller-recorder 36$b^5$ (similar to controller-recorder 36b, FIG. 1) which in turn operates a fuel valve 32$a^5$ (similar to valve 32a, FIG. 1) on an auxiliary hot gas furnace 68 to increase or decrease the supply of heated fluid through the hot gas line 42.

In addition, fluid flow control means 70 (FIG. 5) are provided and have the venturi gas flow sensor 49 of the type GE–MAC 554 manufactured by General Electric Co., Schenectady, N.Y. connected to a single purpose analog computer 70a such as type GE–MAC 564 or GE–MAC 565 manufactured by General Electric Co., Schenectady, N.Y. to produce a gas mass flow signal. The signal from computer 70a operates the actuator 36$c^5$ to satisfy the set point on computer 70a so as to produce a constant mass flow through the dryer-preheater 38. The pressure developed by the fan 28a can be controlled by controlling the speed of motor 70b.

The control structure 72 utilized as speed control means has a tachometer 72a on the motor 14j connected to a kiln speed controller-recorder 72b (similar to controller-recorder 32d, FIGS. 1,5) which controller-recorder 72b controls a variable speed motor 72c connected to the pellet feeder and gas lock device 72d of the type manufactured by Fuller Co., Catasauqua, Pa.

FIG. 6 shows apparatus for making raw material pellets 10. The raw material 11 in a feed tank 50 is fed onto a weigh feeder 52 (similar to weigh feeder 20b, FIGS. 1,4) and via a chute 54 to a pelletizer 56 of the disc type, manufactured by Dravo Corp., Pittsburgh, Pa. A conveyor 58 carries the pellets 10 to an elevator 60 which transports such pellets 10 to the hopper 40 via a chute 60a. Alternatively, an extruder 56$^1$ (mounted on casters 56'a) of the type manufactured by J. C. Steele & Sons, Inc., Statesville, N.C., may be employed to produce generally cylindrical shaped pellets 10 having a length to diameter ratio of approximately 1.0.

METHOD

It will be understood by those skilled in the art from the above description of the preferred embodiment of the apparatus 12 (FIG. 1) and the alternative embodiments of the apparatus 12$^4$ (FIG. 4) and 12$^5$ (FIG. 5) that an improved method is provided for pyroprocessing into sinter 10g, raw material pellets 10 having a reaction temperature of about 2,200° to 3,000° F. and containing moisture is provided. This method includes the steps of:

a. receiving the raw material pellets 10 (FIGS. 1, 4, 5) in one end 14a of a rotary kiln 14, etc., and moving the raw material pellets 10 along a path of movement in the rotary kiln 14, etc., to the other end 14b of the rotary kiln 14, etc.

b. directing a heated fluid through the rotary kiln 14, etc.

c. heating the raw material pellets 10 by the heated fluid adjacent the one end 14a, etc., of the rotary kiln 14, etc., to substantially remove the moisture in the raw material pellets 10, d. mixing a cooling fluid with the heated fluid to limit the temperature (about 700° F.) during the removal of the moisture below the temperature (about 700° F.) at which the raw material pellets 10 explode due to rapid heating to a deleteriously high temperature, e. heating the raw material pellets 10 in a preheating zone PZ of the rotary kiln 14, etc., further along the path of movement to a temperature (about 500°—700° F. below the reaction temperature of about 2,200° to 3,000° F.), f. damming a reservoir 10e of the raw material pellets 10 (FIG. 1) adjacent the preheating zone PZ and further along the path of movement so that the reservoir 10e of the raw material pellets 10 is protected from the direct radiation of the heated fluid and the temperature of the reservoir 10e of the raw material pellets 10e remains unaffected by instantaneous changes in the temperature of the heated fluid, g. metering minimum layers 10f of the raw material pellets 10e adjacent the preheating zone PZ and further along the path of movement into a reaction zone RZ of the rotary kiln 14, etc., adjacent the other end 14b, etc., of the rotary kiln 14, etc., and h. providing a surface by means of the reaction zone faces (FIGS. 1,4,5) of the dam 26 which will reflect an appreciable amount of heat back into the reaction zone RZ, thus providing a more efficient use of the heating fluid, and i. heating the minimum layers 10f of the raw material pellets 10 individually and rapidly in the reaction zone RZ of the rotary kiln 14, etc., to individually and rapidly heat he minimum layers 10f of the raw material pellets 10 to the reaction temperature of about 2,200° to 3,000° F. by the heated fluid thus converting the raw material pellets 10 into sinter 10g.

Typical Installation

Referring to FIGS. 1, 4, 5 and assuming that the kilns 14 (FIG. 1), 14$^4$ (FIG. 4) and 14$^5$ (FIG. 5) have a diameter inside the kiln of D, the length of the reaction zone RZ to 'D ratio should be about 2.5 to 4.5 depending on the speed of the kiln 14, etc., which speed may vary between about 1 r.p.m. and 4 r.p.m. with a peripheral speed of the inside of the shell 14c to be about 55 feet/minute. Speeds in the range of about 30 to 120 feet/minute are usable.

The preheating zone PZ having a length PZ should have a preferred PZ/D ratio of about 3.0 although a ratio in the range of about 0.25 to 10.0 is permissible.

The drying zone DZ, having a length DZ has a DZ/D ratio which depends on the heat sensitivity of the green raw material pellets 10 and desirably has a DZ/D ratio in the range of about 4.0 to 14.0.

The angle of inclination a (FIG. 1) of the dam 26 is about 45° to impart a rapid forward motion to the pellets 10 in the reservoir 10e but values of the angle a in the range of about 30° to 80° are practical.

Residence time in the reaction zone RZ (FIG. 1) is about 2 to 10 minutes at about 2,200° to 3,000° F. as compared to a conventional kiln (not shown) residence time of about 20 to 45 minutes. This shortened residence time in the reaction zone RZ is sufficient to form the desired compounds. The short residence time with the continuous movement of the minimum layers 10f of the pellets 10 acts to prevent the deposition of a coating on the shell 14c (FIG. 1) of the kiln 14.

Utilizing pellets 10 having about 11 percent water, the residence time in the drying zone DZ should be about 20 minutes so that the pellets 10 can be heated from ambient temperature (about 70° F.) to about 700° F. at the end of the drying zone DZ.

A residence time of about 30 minutes or less in the preheating zone PZ is sufficient to heat the pellets 10 to the desired temperature of less than about 2,000° F. temperature prior to entrance of the pellets 10 into the reaction zone RZ.

The diameter $D_t$ of the throat 26a of the dam 26 (FIG. 1) is about 0.5D and a range of about 0.3D to 0.8D is practical.

SUMMARY OF THE ACHIEVEMENT OF THE OBJECTS OF THE INVENTION

It will be recognized by those skilled in the art that the objects of this invention have been achieved by providing an improved method of and apparatus 12 (FIG. 1), $12^4$ (FIG. 4) and $12^5$ (FIG. 5) for pyroprocessing into sinter 10g (FIG. 1) raw material pellets 10 having a reaction temperature of about 2,500°—2,700° F. and containing moisture. The apparatus 12, etc., and method provide a kiln 14 (FIG. 1) $14^4$ (FIG. 4) and $14^5$ (FIG. 5) having a length about one-third to two-thirds the length of conventional kilns, provide a greater throughput per unit length than conventional kilns and provide lower capital cost and installation costs than conventional kilns; provide a shorter time interval at the temperature of formation for liquid forming compounds (at about 2,200° to 3,000° F.) thereby substantially eliminating the deposition of a coating on the kiln lining 14c, etc., in the sintering zone RZ, maintain the load temperature in the preheating zone PZ below about 2,000° F. prior to the sintering zone RZ and thereafter raise the load temperature very rapidly, remove the load quickly from the kiln 14, etc., after the load 10 reaches reaction temperature (about 2,200°—3,000° F.) in the sintering zone RZ, provides a traveling single or double layer 10f of raw material 10 in the sintering zone RZ thus providing direct contact between the raw material 10 and heated fluid gases in the sintering zone RZ, and reduces the reaction time in the sintering zone RZ from about 20—45 minutes to about 2—10 minutes.

While in accordance with the patent statutes preferred and alternative embodiments of this invention have been illustrated and described in detail, it is to be particularly understood that the invention is not limited thereto or thereby.

We claim:

1. Apparatus for pyroprocessing into sinter raw material pellets having a reaction temperature and containing moisture, said apparatus having:
    a. a rotary kiln adapted to receive said raw material pellets at one end of said rotary kiln and to move said raw material pellets along a path of movement in said rotary kiln to the other end of said rotary kiln,
    b. heating means adjacent said other end of said rotary kiln for directing a heated fluid through said rotary kiln,
    c. said rotary kiln having a drying means adjacent said one end of said rotary kiln for heating said raw material pellets by said heated fluid to substantially remove said moisture in said raw material pellets,
    d. cooling means communicating with said drying means for mixing a cooling fluid with said heated fluid to limit the temperature in said drying means below the temperature at which said raw material pellets explode due to rapid heating to a deleteriously high temperature,
    e. said rotary kiln having a preheating zone adjacent said drying means further along said path of movement for heating said raw material pellets to a temperature below said reaction temperature,
    f. said rotary kiln having a reaction zone adjacent said other end of said rotary kiln for heating said raw material pellets above said reaction temperature to pyroprocess said raw material pellets into said sinter, and
    g. restriction means between said preheating zone and said reaction zone for damming a reservoir of said raw material pellets adjacent said restriction means so that said reservoir of said raw material pellets are protected from the direct radiation of said heated fluid and the temperature of said reservoir of said raw material pellets remains unaffected by instantaneous changes in the temperature of said heated fluid,
        1. said restriction means being operable to meter minimum layers of said raw material pellets into said reaction zone so that said minimum layers of said raw material pellets are individually and rapidly heated to said reaction temperature by said heated fluid and said raw material pellets are converted into said sinter, and
        2. said restriction means being operable to reflect heat from said heated fluid into said reaction zone so that paid reaction temperature is attained with a reduced amount of fuel.

2. A method for pyroprocessing into sinter, raw material pellets having a reaction temperature and containing moisture, said method including the steps of:
    a. receiving said raw material pellets at one end of a rotary kiln and moving said raw material pellets along a path of movement in said rotary kiln to the other end of said rotary kiln,
    b. directing a heated fluid through said rotary kiln,
    c. heating said raw material pellets by said heated fluid adjacent said one end of said rotary kiln to substantially remove the moisture in said raw material pellets,
    d. mixing a cooling fluid with said heated fluid to limit the temperature during the removal of said moisture below the temperature at which said raw material pellets explode due to rapid heating to a deleteriously high temperature,
    e. heating said raw material pellets in a preheating zone of said rotary kiln further along said path of movement to a temperature below said reaction temperature,
    f. damming a reservoir of said raw material pellets adjacent said preheating zone and further along said path of movement so that said reservoir of said raw material pellets is protected from the direct radiation of said heated fluid, the temperature of said reservoir of said raw material pellets remaining unaffected by instantaneous changes in the temperature of said heated fluid,
        1. reflecting heat from said heated fluid into said reaction zone so that reaction temperatures are attained with a reduced amount of fuel,
    g. metering minimum layers of said raw material pellets adjacent said preheating zone and further along said path of movement into a reaction zone of said rotary kiln adjacent said other end of said rotary kiln, and
    h. heating said minimum layers of said raw material pellets individually and rapidly in said reaction zone of said rotary kiln to individually and rapidly heat said raw material pellets to said reaction temperature by said heated fluid thus converting said raw material pellets into said sinter.

3. The apparatus recited in claim 1 wherein said drying means is a drying zone of said rotary kiln, said drying zone being provided with a partition on said rotary kiln for separating said raw material pellets into streams.

4. The apparatus recited in claim 3 and having a baffle between said partition and said cooling means.

5. The apparatus recited in claim 1 wherein said drying means is in communication with said one end of said rotary kiln.

6. The apparatus recited in claim 1 wherein said cooling means has a shroud member disposed about said rotary kiln and a cooling fluid supply means connected to said shroud member.

7. The apparatus recited in claim 6 wherein said rotary kiln carries an inlet member in communication with said shroud member.

8. The apparatus recited in claim 1 and having pumping means in communication with said one end of said rotary kiln for moving said heated fluid through said rotary kiln.

9. The apparatus recited in claim 1 and having cooler means adjacent said other end of said rotary kiln for cooling said sinter.

10. The apparatus recited in claim 1 and having valve means associated with said heating means, reaction zone temperature measuring means adjacent said reaction zone for measuring said reaction zone temperature and a first control means connected to said valve means and said reaction zone temperature measuring means for controlling said heating means.

11. The apparatus recited in claim 8 and having pressure measuring means adjacent said other end of said rotary kiln, and a second control means connected to said pumping means and said pressure measuring means for controlling the flow of said heated fluid through said rotary kiln.

12. The apparatus recited in claim 1 and having drying temperature measuring means associated with said drying means and a third control means connected to said drying temperature measuring means and said cooling means for controlling the flow of said cooling fluid into said drying means.

13. The method recited in claim 2 wherein the heating of said raw material pellets by said heated fluid is performed in a preheating zone of said rotary kiln.

14. The method recited in claim 2 wherein the heating of said raw material pellets by said heated fluid is performed in a drying means which is in communication with said one end of said rotary kiln.

15. The method recited in claim 2 and including the step of separating said raw material pellets into streams while heating said raw material pellets by said heated fluid to substantially remove the moisture in said raw material pellets.

16. The method recited in claim 2 and including the step of pumping said heated fluid through said rotary kiln.

17. The method recited in claim 2 and including the step of cooling said sinter.

18. The method recited in claim 2 and including the steps of:
   a. measuring the reaction zone temperature, and
   b. controlling the temperature of said heated fluid directed through said rotary kiln.

19. The method recited in claim 2 and including the steps of:
   a. measuring the pressure adjacent said other end of said rotary kiln, and
   b. controlling the flow of said heated fluid through said rotary kiln.

20. The method recited in claim 2 and including the steps of:
   a. measuring the drying temperature, and
   b. controlling the flow of said cooling fluid into said heated fluid.